United States Patent
Bohm

(10) Patent No.: US 8,108,567 B2
(45) Date of Patent: Jan. 31, 2012

(54) METHOD AND APPARATUS FOR CONNECTING HDMI DEVICES USING A SERIAL FORMAT

(75) Inventor: Christian Willibald Bohm, Rattenberg (DE)

(73) Assignee: Analog Devices, Inc., Norwood, MA (US)

(*) Notice: Subject to any disclaimer, the term of this patent is extended or adjusted under 35 U.S.C. 154(b) by 271 days.

(21) Appl. No.: 12/612,868

(22) Filed: Nov. 5, 2009

(65) Prior Publication Data

US 2010/0321573 A1    Dec. 23, 2010

Related U.S. Application Data

(60) Provisional application No. 61/218,504, filed on Jun. 19, 2009.

(51) Int. Cl.
*G06F 13/00* (2006.01)
*G06F 5/00* (2006.01)
*H03M 9/00* (2006.01)

(52) U.S. Cl. .................. 710/14; 710/8; 710/62; 710/71; 710/300

(58) Field of Classification Search .................. None
See application file for complete search history.

(56) References Cited

U.S. PATENT DOCUMENTS

| | | | |
|---|---|---|---|
| 4,782,488 A | 11/1988 | Anderson | |
| 5,561,714 A | 10/1996 | Hershberger | |
| 5,606,317 A | 2/1997 | Cloonan et al. | |
| 5,892,467 A | 4/1999 | Kim | |
| 6,052,072 A | 4/2000 | Tsang et al. | |
| 6,359,930 B1 | 3/2002 | Nakagawa et al. | |
| 7,263,152 B2 | 8/2007 | Miller et al. | |
| 7,321,697 B2 | 1/2008 | Sudharsanan et al. | |
| 7,391,836 B2 | 6/2008 | Miller et al. | |
| 7,460,786 B2 | 12/2008 | Miller et al. | |
| 7,617,064 B2 | 11/2009 | Stakely et al. | |
| 7,684,437 B2 | 3/2010 | Miller et al. | |
| 7,702,059 B2 | 4/2010 | Miller et al. | |
| 7,742,438 B1 | 9/2010 | Xu et al. | |
| 7,793,022 B2 | 9/2010 | Travers et al. | |
| 2004/0263941 A1 | 12/2004 | Chen et al. | |
| 2006/0209892 A1 | 9/2006 | MacMullan et al. | |
| 2006/0280055 A1 | 12/2006 | Miller et al. | |
| 2008/0247414 A1 | 10/2008 | Sheafor et al. | |
| 2008/0250175 A1 | 10/2008 | Sheafor et al. | |

(Continued)

OTHER PUBLICATIONS

Pohlmann, 1992, The Compact Disc Handbook, vol. 5, The Computer Music and Digital Audio Series, pp. 47-101.

*Primary Examiner* — Ilwoo Park
(74) *Attorney, Agent, or Firm* — Kenyon & Kenyon LLP

(57) ABSTRACT

An apparatus and a method for providing serialized HDMI data from an HDMI source to an HDMI sink. An HDMI transmitter may include inputs including control inputs, a deserializer, and a parser. The inputs may receive serialized HDMI data from an HDMI data source. A deserializer may deserialize the serialized HDMI data received on each of the respective inputs and outputting parallel data for each of the inputs. A parser may parse the parallel data output from the deserializer from each of the respective inputs into serial video data at a first clock rate and audio data at a second clock rate. Control inputs of the transmitter may be set to a first mode in which from the deserializer is caused to bypass the parser, and the parallel data is output from the HDMI transmitter.

12 Claims, 3 Drawing Sheets

U.S. PATENT DOCUMENTS

| | | |
|---|---|---|
| 2009/0022176 A1* | 1/2009 | Nguyen ........................ 370/466 |
| 2009/0083825 A1 | 3/2009 | Miller et al. |
| 2009/0103727 A1 | 4/2009 | Heywood et al. |
| 2009/0260043 A1* | 10/2009 | Tatsuta et al. ................... 725/81 |
| 2010/0023825 A1 | 1/2010 | Stakely et al. |
| 2010/0194966 A1 | 8/2010 | Abe |

* cited by examiner

METHOD AND APPARATUS FOR CONNECTING HDMI DEVICES USING A SERIAL FORMAT

This application claims the benefit of U.S. Provisional Patent Application Ser. No. 61/218,504 filed on Jun. 19, 2009, the entire contents of which are incorporated herein by reference.

BACKGROUND

High-Definition Multimedia Interface (HDMI) has become the prevalent specification for transmitting digital video and audio data from high bandwidth data sources to digital data presentation devices. The HDMI interface includes different data streams. The data streams comprise three channels (2 differential signals per channel) of high speed transition minimized differential signaling (TMDS) serial data, a high speed clock channel for de-serializing of the three channels of TMDS data, a number of pseudo-static signals, such as +5V power and hot plug detect, and two low bandwidth communications channels. The low bandwidth communications channels can be the consumer electronics control (CEC) and display data channel (DDC). Due to the differing data rates of the different data types in the data stream that are transmitted back and forth between a HDMI source, e.g., DVD player, and a HDMI sink, e.g., television, a number of twisted pair and single copper wires are presently used to form the cables that connect the HDMI source to the HDMI sink. The complexity of cables and the cost of materials, such as copper, make the cables expensive to make. In addition, the length of the cables is limited due to losses associated with the copper wires. There is a need to replace the copper wires with more efficient and cost-effective alternatives.

One alternative to replace the copper cable is optical fiber. However, merely replacing the copper cables with a number of optical fibers is not cost effective due to the increased complexity of the fiber connection and the hardware required to convert the electrical signals to optical signals for each channel of data. It would be beneficial if a single optical cable could be used. In order to use a single optical cable, designers have realized that serializing all components of the HDMI interface for transport over the optical cable would be one efficient alternative. However, obtaining or generating the serialized TMDS data has yet to be successfully demonstrated in a commercially viable product.

Accordingly, there is a need for providing serialized data for delivery from an HDMI source to an HDMI sink over a single fiber optic cable.

DETAILED DESCRIPTION

Exemplary embodiments provide a method for providing serialized HDMI data from an HDMI source to an HDMI sink. The method includes receiving transition minimized differential signaling (TMDS) data in a multiple channel serialized format as output from an HDMI source with one channel of clock data for deserializing the three channels of TMDS data. The multiple channels of deserialized TMDS data may be combined to form a single serialized bitstream with the TMDS clock embedded. The single serialized bitstream sequence may be transmitted over a communication medium such as an optical fiber. The single serialized bitstream sequence may be received from the communication medium and de-serialized. The TMDS data may be re-formatted to a data format suitable for transmission to a HDMI sink and the TMDS clock may be re-created to clock the data out.

An exemplary embodiment of an apparatus for transferring high definition multimedia interface (HDMI) standard-compliant data from a high definition multimedia interface (HDMI) data source is disclosed. The apparatus may include a first electrical interface, a AD9880 HDMI receiver, a second electrical, and means to engage. The first electrical interface to the HDMI data source is for receiving HDMI-compliant data from the HDMI data source. The AD9880 HDMI receiver device has input pins coupled to the first electrical interface and output pins. The receiver device may have a diagnostic mode that outputs HDMI signals including audio data in a parallel format and a run time mode that outputs HDMI video signals in a first format and audio data in a second format. The first format is different from the second format. The second electrical interface may be coupled to an output pin to a serial cable. The receiver device's diagnostic mode may be engaged by a means to a runtime environment.

In another embodiment, disclosed is an HDMI transmitter may include inputs including control inputs, a deserializer, and a parser. The inputs may receive serialized HDMI data from an HDMI data source. A deserializer may deserialize the serialized HDMI data received on each of the respective inputs and outputting parallel data for each of the inputs. A parser may parse the parallel data output from the deserializer from each of the respective inputs into serial video data at a first clock rate and audio data at a second clock rate. Control inputs of the transmitter may be set to a first mode in which from the deserializer is caused to bypass the parser, and the parallel data is output from the HDMI transmitter.

Figure 1:
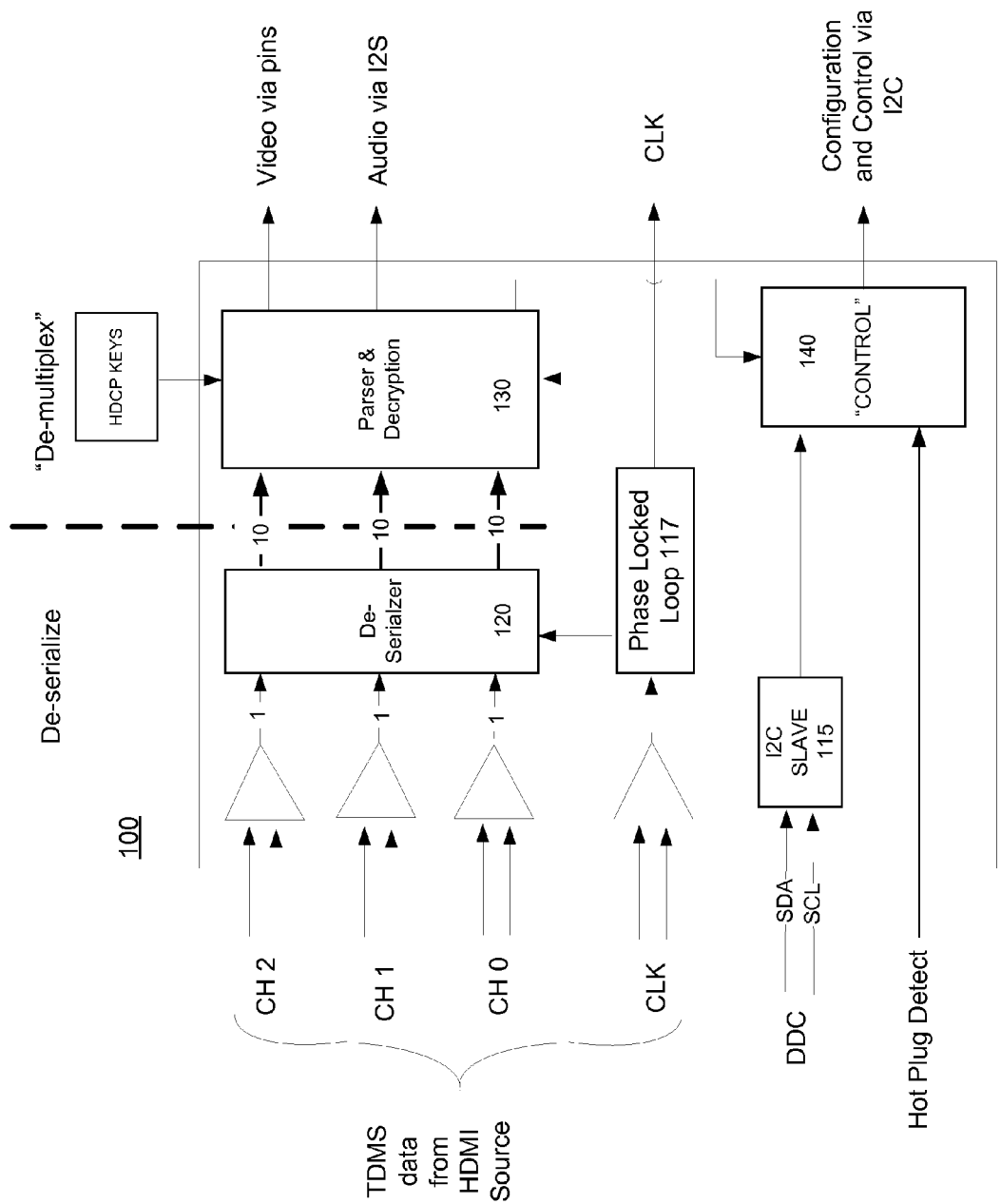
FIG. 1 illustrates an example of the conventional data flow through an HDMI receiver.

FIG. 1 illustrates an example of the conventional data flow through an HDMI receiver. The HDMI receiver 100 includes inputs, a I2C slave circuit 115, a phase locked loop 117, a de-serializer 120, a parser and decryption circuit 130, HDCP keys, and a control device 140. The HDMI receiver 100 has inputs for 4 channels of TMDS data (each channel comprising a pair of differential signals) from the HDMI source including clock CLK data. The HDMI receiver 100 also has outputs for the video data on a plurality of pins, audio data, clock CLK and configuration and control via I2C standard.

Transition minimized differential signaling (TMDS) is used in the digital video interface (DVI) and high definition multimedia interface (HDMI) standards. It comprises serialized video data for each component in the color space, for example, R, G and B in the Red-Green-Blue color space and clock data for de-serializing the video data. The conventional data flow is from an HDMI source, such as a DVD player, that provides 3 channels (channels 0-2) of TMDS serialized video data and 1 channel of clock data.

The de-serializer 120 de-serializes the TMDS data using the clock CLK into 10 parallel data streams per TMDS channel (or 30 parallel data channels), and provides the parallel data to a parser and decryption component 130.

The clock signal CLK from the HDMI source is input into a phase locked loop 117, which provides the clock signal to the de-serializer 120, parser and decryption component 130 and outputs the clock signal CLK.

Parser and decryption component 130 parses the parallel data from the de-serializer. The parallel data contains video, audio and auxiliary packet information as well as synchronization signals. The parser examines the parallel data to find and extract those components (video, audio, auxiliary packets and synchronization signals). The auxiliary data packets are typically stored in an internal memory space. The synchronization information, the video and audio data are formatted for distribution on the respective video and audio output pins of the receiver. Parser and decryption component 130 may output audio data, for instance, in the integrated interchip sound (I2S) format. If necessary, decryption is performed using the HDCP keys.

The controller 140 receives data from the parser and decryption component 130 and stores it in memory. Controller 140 also receives display data channel signals (SDA and SCL) from the I2C slave 115 and hot plug detect signals.

Outputs from the HDMI receiver 100 include video data, audio data, clock data and configuration and control via the I2C standard. The video data is output on the pins of the receiver 100 at a first data rate as given by the clock signal CLK. The audio data is output with an embedded clock at a second data rate on audio pins. The control and configuration data read via I2C in an asynchronous fashion is also output.

To create a single serial data stream, all three data streams (video @ pins, audio @ pins, control @ I2C) must be first combined into a single clock domain and serialized with a serialization clock. The serialization clock is typically embedded in the serial data stream. The serial data stream arrangement facilitates transmission of the complete HDMI data via a single bit (e.g. a single optical fiber).

Figure 2:
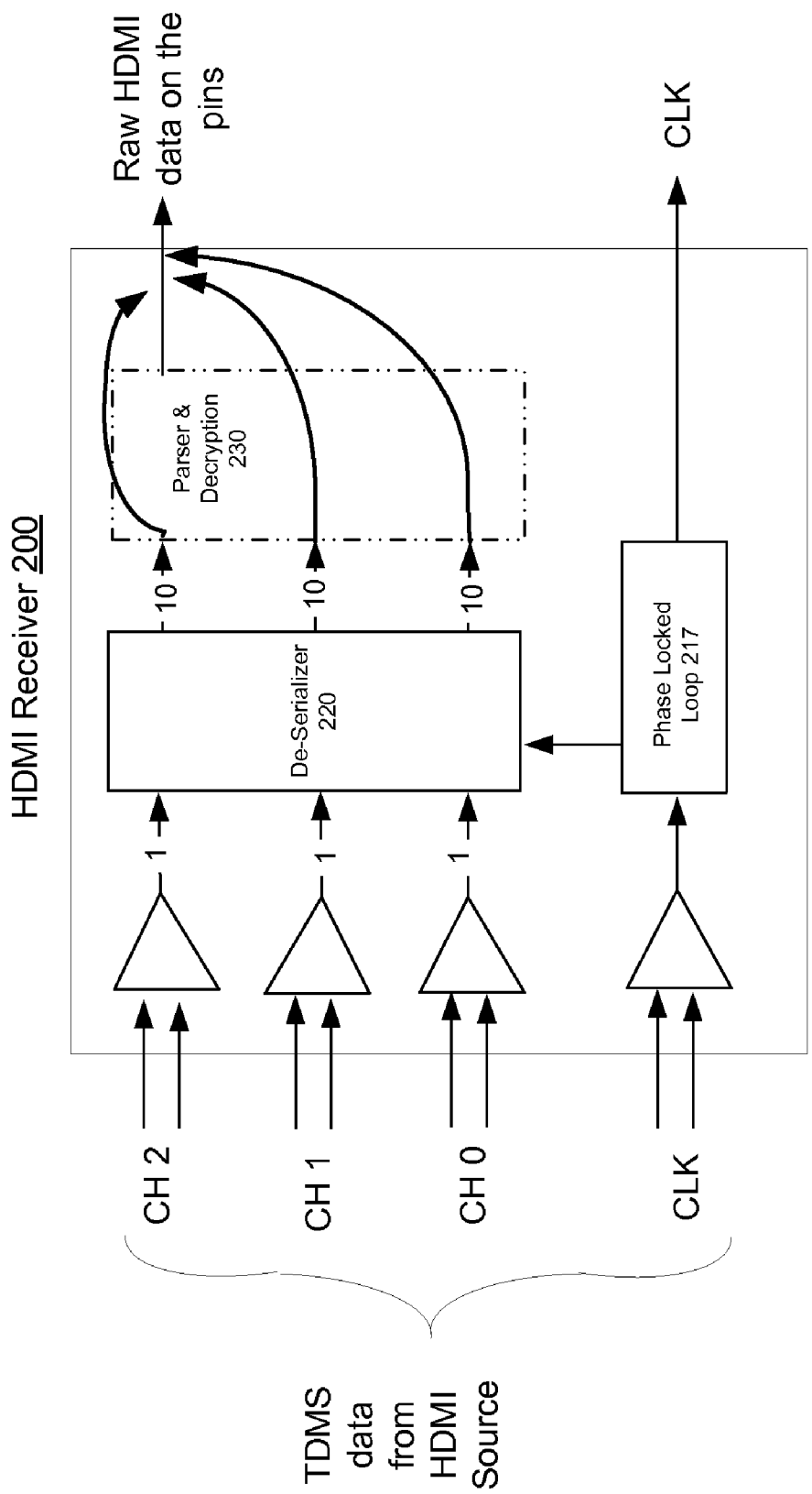
FIG. 2 illustrates a block diagram of an HDMI receiver according to an embodiment of the present invention.

FIG. 2 illustrates an exemplary embodiment of an HDMI receiver according to an embodiment of the present invention.

The HDMI receiver 200 is substantially the same as the HDMI receiver 100 shown above with respect to FIG. 1. However, due to diagnostic settings for a diagnostic mode, the HDMI receiver 200 can be configured to output audio, video, and auxiliary (AVA) data, which comprises unparsed TMDS data having video, audio and auxiliary (e.g., info-frames) data packets, on the pins. Unparsed TMDS data may or may not be encrypted. If the data is encrypted, the encryption remains. If the data is not encrypted, the data remains unencrypted. The data can be passed through as provided by the receiver 200.

The receiver 200 may have multiple inputs for receiving multiple channels of input signals. In an exemplary embodiment, the receiver 200 may have three (3) inputs for receiving three (3) channels (CH 0-2) of TMDS data and 1 input for receiving 1 channel for clock CLK according to the HDMI specification. The CLK may be used for data de-serialization, and synchronizing delivery of HDMI data between an HDMI source and an HDMI sink.

The three channels of TMDS data which include video, audio and auxiliary data may be provided to the de-serializer 220. The de-serializer 220 de-serializes each of the three channels of serialized TMDS data into ten (10) channels of parallel data. In total, thirty (30) channels of audio, video, auxiliary (AVA) data, which includes video, embedded audio and auxiliary data packets, may be output from the de-serializer 220.

A phase locked loop 217 receives the clock CLK signal from the HDMI source and passes the clock signal CLK to the de-serializer 220 where it is used to de-serialize the TMDS data. The clock CLK signal is also output from the phase locked loop 217 for output from the receiver 200.

Due to the diagnostic mode settings of the receiver, instead of the data being output from the de-serializer 220 to a parser and decryption component 230 (shown in phantom), the AVA data may be output directly on the output pins of the receiver 200.

On the AD9880 HDMI receiver from Analog Devices Inc., for instance, the diagnostic mode setting are made by setting the following register bits:
  Register 54, Bits [3:0] set to 0110
  Register 2E, Bit [7] set to 1

The diagnostic mode may be set by manually setting the pin connections or via a controller configured to switch pin settings on the AD9880 HDMI receiver according to user inputs or designer configurations. Of course, other methods are known for configuring the pin settings. The thirty (30) parallel bits (AVA data) on a respective one of the thirty channels comprise unparsed TMDS video, audio data and auxiliary data packets (e.g., info-frames). In addition, the clock signal CLK may have the same high bandwidth clock output from the HDMI source. The output of the receiver 200 can be parallel AVA data including video, audio and auxiliary data packets and a clock signal. Applying the diagnostic settings, the following data appears on the output pins of the AD9880:
  TMDS_ch2[9:0]=Output Pins {Red[7:0], Green[7:6]}
  TMDS_ch1[9:0]=Output Pins {Green[5:0], Blue[7:4]}
  TMDS_ch0[9:0]=Output Pins {Blue[3:0], I2S[3:0], VS, HS}

Accordingly, the receiver 200 can be a multi-modal chip that is configurable to provide in two run-time modes either 1) may output 30 bits of parallel AVA data on the available pins (i.e., diagnostic mode), or 2) video on a first set of pins and audio on a second set of pins, and auxiliary data packets via I2C as shown in FIG. 1. The multi-modal chip may be configured manually or by an automated process. The receiver 200 is capable of providing high-definition 1080i data of 30 bits at 74.25 Mhz.

The first runtime mode, in which 30 bits of parallel AVA data is output on the available pins, may be used in the exemplary embodiments. The serialization of the data provided in the first runtime mode will be described in more detail with reference to FIG. 3.

Figure 3:
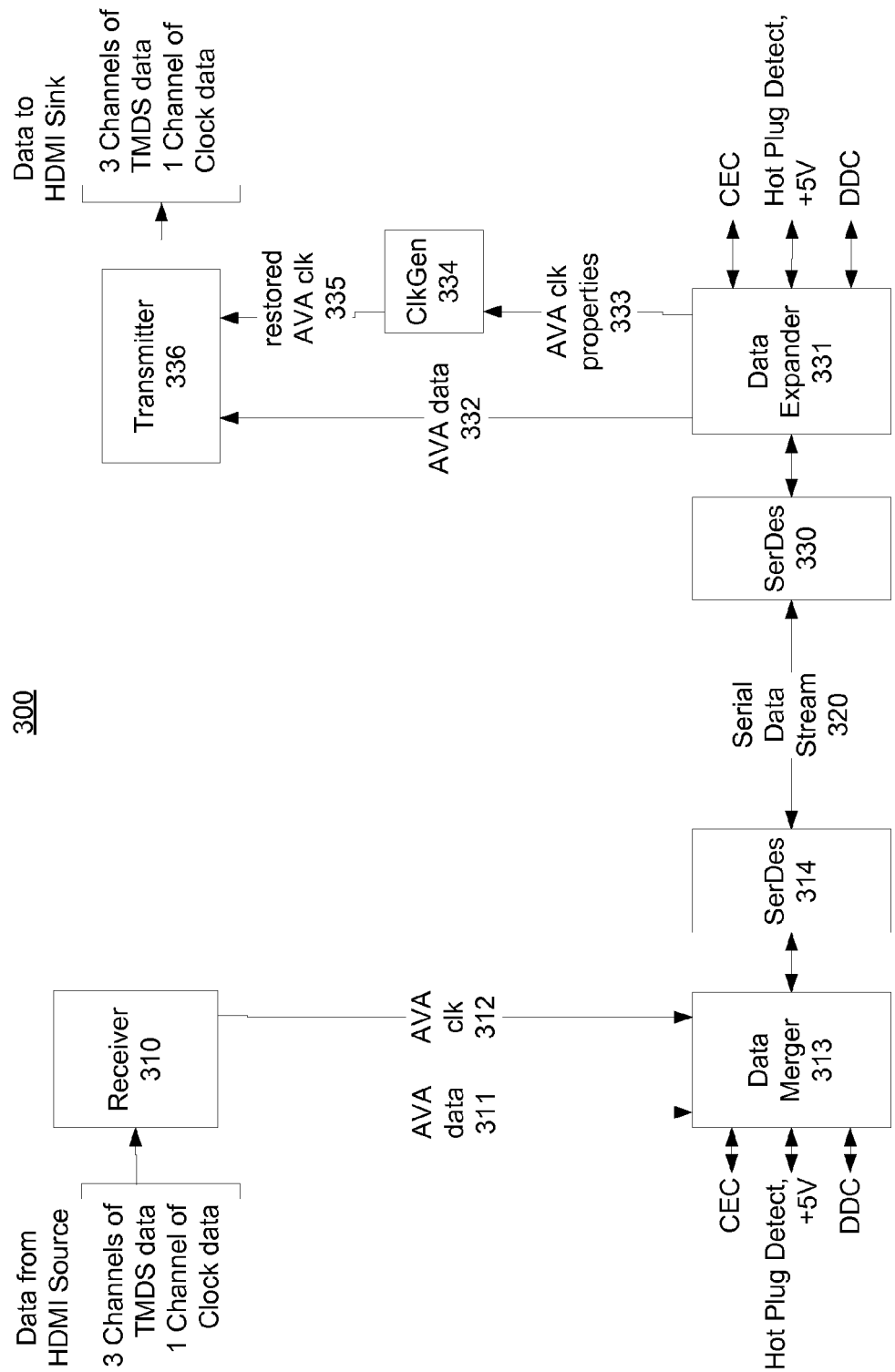
FIG. 3 illustrates an exemplary implementation according to an embodiment of the present invention

FIG. 3 illustrates a conceptual diagram according to an embodiment of the present invention. The exemplary embodiment 300, such as a cable, includes a receiver 310, a data merger 313, a serializer/deserializer (Serdes) 314, a communication medium carrying a serialized data stream 320, a second serializer/deserializer (serDes) 330, data expander 331, a clock generator 334 and a transmitter 336. The receiver 310 can operate in either of two runtime modes depending upon the pin settings of the receiver. The following description describes the operation of the system 300 when the pins are set for operation in the first run-time mode (diagnostic mode), where 30 bits of parallel AVA data is output on the available output pins.

The audio, video, and auxiliary (AVA) data from a HDMI source is received at an exemplary cable embodiment 300 as 3 channels of TMDS data in a color format, such as RGB, YUV or YCbCr, with 1 channel of clock data, consumer electronic control (CEC), hot plug Detect, +5V and display data channel (DDC).

The multiple channels of TMDS data from the HDMI source, in this case, three (3) channels of TMDS data, in which each serial data channel of AVA data can comprise ten (10) bit words of data in a color space, such as one channel for each of R, G and B video data and embedded audio data. Of course, other color spaces such as YUV or YCbCr may be used. This data is fed to the receiver 310.

The clock channel provides a high speed clock signal. The clock channel information may be directly provided to, or derived from data provided by, the HDMI source. The clock signal can have an approximate rate of, for example, 74.25 Mhz to greater than 200 Mhz that may be used for de-serializing the 3 channels of TMDS data. Of course, other clock rates may be used.

The receiver 310 de-serializes the 3 channels of TMDS data using the clock channel information. The result of the de-serialization is a multi-bit parallel stream of AVA data 311, accompanied by an AVA clk 312.

The AVA clk 312 may be frequency related to the clock channel as provided by the HDMI source. The AVA clk 312 provides the timing for the transfer of the AVA data 311 to the Data Merger 313. The AVA data 311 may be provided on a parallel bus of de-serialized data derived from receiver 310. Data Merger 313 forms a unified data stream by combining the AVA data 311 and AVA clk 312. Any combination of the consumer electronics control (CEC), Hot Plug Detect, +5V and display data channel (DDC) data may also be combined into the unified data stream. The AVA clock 312 may be clock information sent from receiver 310. Alternatively, the AVA clock 312 may be embedded into the AVA data 311, or key parameters of the AVA clock 312, such as the frequency, may be derived at the receiver 310, for example, and processed by the Data Merger 313.

The CEC data, DDC data and the link verification data (e.g., hotplug detect) are low bandwidth communications data. For example, the CEC data can be transmitted at less than 10 kHz, and the DDC data can conform with the I2C standard and can run at about 400 kHz. The link verification data, such as the hot plug detect and the +5V cable connection signal, are pseudo-static signals that typically do not change while the HDMI source and HDMI sink have power applied or are "ON."

Other application-specific, additional information signals may also be included, or excluded if unnecessary, as support for computer equipment (e.g., mouse, keyboard), infrared remote control extenders or other information signals.

The serializer/deserializer (Serdes) 314 may take the unified data stream as produced by the data merger 313 and re-formats it to a form suitable for transmission as serial data stream 320 over a communication medium. The formatting may include embedding of a link clock (not shown) for the serial data stream 320, coding schemes as typically associated with high speed serial data communications, and the like. The clock signal may be represented by properties of the clock signal CLK (e.g., frequency) embedded with the AVA data in a serial bit stream.

The serializer/deserializer (Serdes) 314 may have bi-directional functionality, where it acts as a serializer for data sent from the HDMI source to the HDMI sink (e.g. TMDS data, +5V signal or downstream portions of DDC), and as a de-serializer for data sent from the HDMI sink upstream towards the HDMI source (e.g. Hot Plug Detect signal or upstream portions of DDC).

The communication medium carrying the serial data stream 320 may be a bi-directional communication channel in which bandwidth requirements on the downstream portion (HDMI sink) may be different to the bandwidth requirements on the upstream portion (HDMI source) and vice versa. Of course, any devices such electro-optical converters, wireless transmitters and receivers, and the like that are known in the art for placing the serial data stream 320 in a suitable format for transmission may be used.

The serial data stream 320 may be transmitted over a communication medium that can comprise a single optical fiber, a wireless, coaxial cables, or any other type of communication medium.

The serializer/deserializer (serDes) 330 can receive the serial data transmitted downstream over the serial data stream 320 from the data merger 313 and Serdes 314. The serDes 330 may send the downstream data (e.g. from HDMI source to HDMI sink) to the data expander 331. The serDes 330 can also be used to send upstream information (e.g. upstream portion of DDC or upstream portion of CEC) with the serial data stream 320 over the communication medium back to the upstream Serdes 314.

The data expander 331 may reverse the formatting of the TDMS data introduced by the data merger 313. The data expander 331 may takes the unified data stream output from serDes 330, and de-multiplexes the information portions therein. The data expander 331 may recreate the additional information signals (such as DDC, CEC, hot plug detect, +5V and potentially others) and may connect them to the HDMI sink. The data expander 331 may also re-create the AVA data 332, and extracts the properties of the original AVA clk 312 in the form of AVA clk properties 333. The AVA clock properties 333 may be connected to a clock generator (ClkGen) 334.

The clock generator 334 may use the clock properties (e.g., absolute frequency, frequency change, and the like) as extracted by the data expander 331 from the unified data stream to create a restored AVA clk 335. The general behavior of the restored AVA clk 335 matches the behavior of the original AVA clock 312. The restored AVA clk 335 may be sent to the transmitter 336.

The transmitter 336 may receive the AVA data 332 from the data expander 331 as well as the restored AVA clk 335 from the clock generator 334. The transmitter 336 may use the restored AVA clk 335 to convert the AVA data 332 into the 3 channels of TMDS data, and 1 channel of clock data, and provides it to an HDMI sink, e.g., a television.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

I claim:

1. An apparatus for transferring high definition multimedia interface (HDMI) standard-compliant data from a high definition multimedia interface (HDMI) data source, comprising:
   a first electrical interface to an HDMI data source for receiving HDMI-compliant data from the HDMI data source;
   an HDMI receiver device having input pins coupled to the first electrical interface and output pins, the receiver device having a diagnostic mode that outputs HDMI signals including audio data in a parallel format and a run time mode that outputs HDMI video signals in a first format and audio data in a second format, wherein the first format is different from the second format;
   a second electrical interface coupling an output pin to a serial cable, and
   means to engage the receiver device's diagnostic mode in a runtime environment.

2. The apparatus of claim 1, further comprising a serializer configured to:

serialize the HDMI signals output from the receiver device, while in diagnostic mode, into a serial bit stream, and output the serial bit stream to the serial cable.

3. The apparatus of claim 1, further comprising a sink connector for connecting the serial cable to an HDMI sink, wherein the sink connector comprises:
  a deserializer for deserializing the serial bit stream into a parallel bit stream of merged audio, video and auxiliary data, clock signal and other signals;
  a data expander for expanding the merged audio, video and auxiliary data and clock signal with other signals to separate the audio, video and auxiliary data and clock signal;
  a clock generator for restoring the clock signal into a clock signal suitable for processing the audio, video and auxiliary data; and
  a transmitter for converting the audio, video and auxiliary data using the restored clock signal into transition minimized differential signals and an HDMI clock signal and transmitting the transition minimized differential signals and an HDMI clock signal to an HDMI sink.

4. The apparatus of claim 1, the serial cable is selected from one of a single optical fiber, a wireless communication path, and a wire.

5. An HDMI transmitter comprising:
  inputs for receiving serialized HDMI data from an HDMI data source;
  a deserializer for deserializing the serialized HDMI data received on each of the respective inputs and outputting parallel data for each of the inputs,
  a parser for parsing the parallel data output from the deserializer from each of the respective inputs into serial video data at a first clock rate and audio data at a second clock rate; and
  control inputs for setting the transmitter to a first mode in which from the deserializer is caused to bypass the parser, and the parallel data is output from the HDMI transmitter.

6. The transmitter of claim 5, further comprising:
  a clock input for receiving an HDMI clock signal that is passed to the outputs of the transmitter.

7. The transmitter of claim 6, further comprising:
  a serializer for serializing the parallel data output from the HDMI transmitter into a serial bit stream, wherein a clock signal derived from the HDMI clock signal is embedded in the serial bit stream; and
  outputting the serialized data to a transmission medium.

8. The transmitter of claim 5, further comprising:
  a data merger for incorporating auxiliary data into the parallel data output from the parser.

9. A method for providing high definition multimedia interface standard data, the method comprises:
  receiving transition minimized differential signaling (TMDS) data in a multiple channel serialized format and one channel of clock data from a high definition multimedia interface standard data source;
  deserializing the multiple channels of TMDS data using a frequency determined from the clock data using a receiver set having a plurality of run time mode settings, wherein the plurality of run time mode settings include first run time mode settings and second run time mode settings;
  combining the multiple channels of deserialized TMDS data to form a single serialized bitstream, the single serialized bitstream having the clock data embedded therein;
  transmitting the single serialized bitstream sequence over a communication medium;
  deserializing the single serialized bitstream sequence received from the communication medium;
  reformatting the deserialized data into multiple channels of TMDS data and restoring the clock signal to a TMDS clock; and
  sending out the TMDS data using the restored TMDS clock to a high definition multimedia interface standard sink.

10. The method of claim 9, wherein the combining comprises:
  merging data from other data sources into the single serialized bitstream.

11. The method of claim 10, wherein the merging comprises:
  receiving Consumer Electronic Control data, Display Data Control data, hot plug detect, user data or a combination thereof.

12. The method of claim 9, wherein the first run time mode setting is a diagnostic mode setting in which the pin settings are different from the second run time mode setting.

* * * * *